United States Patent [19]

Andrus, Jr. et al.

[11] Patent Number: 5,688,296
[45] Date of Patent: Nov. 18, 1997

[54] CONTROL SYSTEM FOR IGCC'S

[75] Inventors: Herbert Elliott Andrus, Jr., Granby; Paul Robert Thibeault, Windsor, both of Conn.

[73] Assignee: Combustion Engineering, Inc., Windsor, Conn.

[21] Appl. No.: 425,001

[22] Filed: Dec. 27, 1994

Related U.S. Application Data

[63] Continuation of Ser. No. 998,223, Dec. 30, 1992, abandoned.

[51] Int. Cl.$^6$ ............................................. C10J 1/00
[52] U.S. Cl. ............................ 48/197 R; 48/61; 48/86 R; 48/203; 60/39.07
[58] Field of Search ................................ 48/197 R, 203, 48/76, DIG. 10, 86 R, 61; 60/39.02, 39.05, 39.12, 39.18 B, 39.46 G

[56] References Cited

U.S. PATENT DOCUMENTS

| | | | |
|---|---|---|---|
| 2,675,672 | 4/1954 | Schorner | 60/39.281 |
| 3,086,362 | 4/1963 | Foster-Pegg | 60/39.12 |
| 3,704,586 | 12/1972 | Bruns | 60/39.12 |
| 3,704,587 | 12/1972 | Krieb et al. | 60/39.12 |
| 3,765,167 | 10/1973 | Rudolph et al. | 60/39.02 |
| 4,085,578 | 4/1978 | Kydel | 60/39.02 |
| 4,095,419 | 6/1978 | Pfenninger | 60/39.12 |
| 4,168,956 | 9/1979 | Bliskowski | 48/197 R |
| 4,199,933 | 4/1980 | Pfenninger | 60/39.12 |
| 4,212,160 | 7/1980 | Blaskowski | 60/39.12 |
| 4,472,936 | 9/1984 | Uchiyama et al. | 60/39.12 |
| 4,488,398 | 12/1984 | Noguiri | 60/39.12 |
| 4,489,562 | 12/1984 | Snyder et al. | 60/39.12 |
| 4,667,467 | 5/1987 | Archer et al. | 60/39.12 |
| 4,677,829 | 7/1987 | Archer et al. | 60/39.02 |
| 4,896,498 | 1/1990 | Kniziu | 60/39.12 |
| 5,016,435 | 5/1991 | Brannstrom | 60/39.05 |
| 5,197,277 | 3/1993 | Ishigami et al. | 60/39.12 |

FOREIGN PATENT DOCUMENTS

| | | | |
|---|---|---|---|
| 61-145322 | 7/1986 | Japan | 60/39.12 |
| 62-251427 | 11/1987 | Japan | 60/39.12 |
| 62-291904 | 12/1987 | Japan | 60/39.12 |
| 63-100237 | 5/1988 | Japan | 60/39.12 |
| 63-285230 | 11/1988 | Japan | 60/39.12 |

*Primary Examiner*—Timothy McMahon
*Attorney, Agent, or Firm*—Arthur E. Fournier, Jr.

[57] ABSTRACT

A control system particularly suited for effecting control over an integrated gasification combined cycle system (IGCC) that includes at least a fuel feed system, a gasifier system, a product gas cleanup system, a booster compressor and a gas turbine. The subject control system includes a bleed air control valve, a booster compressor bypass control valve, a fuel feed control valve and a product gas shutoff valve. The bleed air control valve, which is connected in fluid flow relation between the gas turbine and the booster compressor of the IGCC, is operable for effecting control over the amount of air that is bled in the IGCC. The booster compressor bypass control valve, which is connected in fluid flow relation between the upstream side and the downstream side of the IGCC, is operable for effecting the bypass of air around the booster compressor of the IGCC. The fuel feed control valve, which is connected in fluid flow relation between the fuel feed system and the gasifier system of the IGCC, is operable for effecting control over the amount of fuel that is fed from the fuel feed system of the IGCC. The product gas shutoff valve, which is connected in fluid flow relation between the product gas cleanup system and the gas turbine of the IGCC, is operable for shutting off the flow of product gas to the gas turbine of the IGCC.

2 Claims, 2 Drawing Sheets

CONTROL SYSTEM FOR IGCC'S

This is a continuation of application Ser. No. 07/998,223, Filed Dec. 30, 1992, now abandoned.

The Government of the United States of America has rights in this invention pursuant to Contract No. DE-FC21-90MC26308.

CROSS-REFERENCE TO RELATED APPLICATION

This application is hereby cross-referenced to the following patent application which was commonly filed herewith and which is commonly assigned: U.S. patent application Ser. No. 07/999,511 filed Dec. 30, 1992, now abandoned, entitled "High Performance, Multi-Stage, Pressurized, Airblown, Entrained Flow Coal Gasifier System", filed in the name of Herbert E. Andrus, Jr.

BACKGROUND OF THE INVENTION

This invention relates to integrated gasification combined cycle systems (IGCC's), and more specifically, to a control system for such IGCC's.

Current governmental air pollution standards limiting the level of emissions from the stacks of fossil fuel-fired power generation equipment have created an urgent need for clean burning fuels. An obvious solution to this problem is to burn fuels which are low in particulate matter and sulfur content, and to do so in a manner that will minimize $NO_x$ emissions. However, such fuels are in relatively short supply and also are relatively more expensive.

One solution to the problem, particularly in the United States where the basic proven energy reserves are predominantly coal, is the gasification of coal to produce a fuel gas suitable for firing in a steam generator and similar devices, or for firing in a gas turbine, which is part of an IGCC. Generally speaking, coal gasification involves the reaction of coal, at high temperatures, with a gas containing oxygen, and steam to produce a gas, containing principally carbon monoxide (CO) and hydrogen ($H_2$), which is suitable for use as a fuel gas.

The processes, which to date have been employed for purposes of achieving coal gasification, can be conveniently divided into three categories:

1. Fixed bed gasification where lump coal is supported on a grate or by other means and the flow of gas and coal may be concurrent or countercurrent;
2. Fluidized bed gasification where crushed or fine coal is fluidized by the gasifying medium, giving an expanded fuel bed that can be visualized as boiling liquid; and
3. Suspension or entrainment gasification where fine coal is suspended in the gasifying medium such that the fine coal particles move with the gasifying medium either linearly or in a vortex pattern.

At one time fixed bed gasifiers were felt by many to be the most attractive from the standpoint of economics. In this regard, the economically desirable features of fixed bed gasifiers were deemed to encompass the following features: their inherent relatively high carbon conversion ratio, the fact that a low producer volume is required per unit of gas production, and the fact that a minimum amount of fuel preparation is required in connection with the use thereof.

By way of exemplification and not limitation, one example of a fixed bed gasifier is that which forms the subject matter of U.S. Pat. No. 3,920,417 entitled "Method of Gasifying Carbonaceous Material", which issued on Nov. 18, 1975 and which is assigned to the same assignee as the present patent application. In accordance with the teachings of U.S. Pat. No. 3,920,417, there is provided a method of producing a clean low BTU fuel gas by the reaction of a carbonaceous fuel with free oxygen and steam in a down-draft fixed bed gasifier.

A subsequent modification in the design of fixed bed gasifiers wherein a second stage has been added in cooperative association with the fixed bed gasifier forms the subject matter of U.S. Pat. No. 4,069,024 entitled "Two-Stage Gasification System", which issued on Jan. 17, 1978 and which is assigned to the same assignee as the present application. In accordance with the teachings of U.S. Pat. No. 4,069,024, there is provided a method and apparatus for directing a low BTU content synthesis gas, as produced in a fixed bed gasifier, for example, of the type previously disclosed in U.S. Pat. No. 3,920,417, through a second stage having a serially interconnected pyrolyzer of so-called "spouting bed" design wherein the hot synthesis gas from the fixed bed gasifier is contacted by a hot carbonaceous charge and lime to utilize its high sensible heat to produce a cool, higher BTU product.

Turning next to a consideration of entrainment, i.e., suspension, gasification, there are examples thereof to be found in the prior art. By way of exemplification and not limitation in this regard, one such example of an entrainment gasification process is that which forms the subject matter of U.S. Pat. No. 4,158,552 entitled "Entrained Flow Coal Gasifier", which issued on Jun. 19, 1979 and which is assigned to the same assignee as the present patent application. In accordance with the teachings of U.S. Pat. No. 4,158,552, a high temperature level of product gas stream is formed by burning primarily char with the existing air supply.

Another example of an entrainment gasification process is that which forms the subject matter of U.S. Pat. No. 4,343,627 entitled "Method of Operating a Two-Stage Coal Gasifier", which issued on Aug. 10, 1982 and which is assigned to the same assignee as the present patent application. In accordance with the teachings of U.S. Pat. No. 4,343,627, an object of the invention disclosed therein is to increase the effectiveness of an entrained flow gasifier by enhancing its ability to produce a product gas having an increased heating value.

Yet another example of an entrained gasification process is that which forms the subject matter of U.S. Pat. No. 4,610,697 entitled "Coal Gasification System with Product Gas Recycle to Pressure Containment Chamber", which issued on Sep. 9, 1986 and which is assigned to the same assignee as the present patent application. In accordance with the teachings of U.S. Pat. No. 4,610,697, there is provided a pressurized coal gasifier for producing a clean, particulate free fuel gas suitable for use in a gas turbine-generator or a feedstock for a methanation or other chemical process.

Still another example of an entrained gasification process is that which forms the subject matter of U.S. Pat. No. 4,680,035 entitled "Two Stage Slagging Gasifier", which issued on Jul. 14, 1987 and which is assigned to the same assignee as the present patent application. In accordance with the teachings of U.S. Pat. No. 4,680,035, a two stage coal gasifier is provided that has a vertically elongated gasifier chamber for upward flow of the gas to an opening at the top.

With respect to control systems for gas turbines, one such control system, by way of exemplification and not limitation, comprises the subject matter of U.S. Pat. No.

4,922,710 entitled "Integrated Boost Compressor/Gas Turbine Control", which issued on May 8, 1990 and which is assigned to General Electric Company. In accordance with the teachings of U.S. Pat. No. 4,922,710 there is provided an integrated fuel gas boost compressor/gas turbine system in which the power requirement for the gas boost compressor is decreased. Moreover, through the use thereof it is said to be possible to significantly reduce the power requirements for the fuel gas boost compressor while providing fuel gas under optimum pressure to a gas turbine. To this end, more specifically there is provided in an integrated control system for a fuel gas boost compressor and gas turbine, a fuel gas boost compressor to boost the fuel gas pressure before supplying the fuel gas to the gas turbine through a stop/speed ratio or pressure control valve and the gas control or volume valve. Pressure drops through these valves are thus minimized, providing savings in system power requirements, by controlling these valves to a fully open position after the gas turbine is started, and during normal control operations. In this way the system control after startup is transitioned to minimize system pressure drop operation, utilizing gas boost compressor flow control during normal operating conditions.

Although gasifier systems and control systems for gas turbines constructed in accordance with the teachings of the various U.S. patents to which reference has been had hereinbefore have been demonstrated to be operative for the purpose for which they have been designed, there has nevertheless been evidenced in the prior art a need for such gasifier systems and such control systems for gas turbines to be further improved if increased use thereof is to be realized. To this end, there has been evidenced in the prior art a need for a new and improved control system for integrated gasification combined cycle systems (IGCC's).

Moreover, there has been evidenced in the prior art a need for a new and improved control system for IGCC's that would be particularly characterized in a number of respects. In this regard, one such characteristic which such a new and improved control system for IGCC's would desirably embody is that it be operative without requiring that a control valve be located downstream of the cleanup system for the gas, which is produced within the gasifier that comprises one of the components of the IGCC. Inasmuch as such control valves are very costly pieces of equipment to provide and operate, the elimination of the need therefor enables a considerable cost saving to be realized through the utilization of such a new and improved control system for IGCC's. Another characteristic which such a new and improved control system for IGCC's would desirably possess is that it would render it possible through the utilization thereof to minimize the pressure drop across the control valves that are employed therewithin. A third such characteristic which such a new and improved control system for IGCC's would desirably possess is that it would render it possible through the utilization thereof to minimize booster compressor power. A fourth such characteristic which such a new and improved control system for IGCC's would desirably possess is that on product gas, which is produced within the gasifier that comprises one of the components of the IGCC, or on product gas/natural gas, it would permit load changes to occur during cycling duty at approximately five percent per minute. A fifth such characteristic which such a new and improved control system for IGCC's would desirably possess is that it would be possible therewith to achieve stable steady state operation on product gas, which is produced within the gasifier that comprises one of the components of the IGCC, or on product gas/natural gas.

It is, therefore, an object of the present invention to provide a new and improved control system.

It is another object of the present invention to provide such a new and improved control system that is particularly suited to be used with integrated gasification combined cycle systems (IGCC's).

It is still another object of the present invention to provide such a new and improved control system for IGCC's which is operative without requiring that a control valve be located downstream of the cleanup system for the gas, which is produced within the gasifier that comprises one of the components of the IGCC.

Another object of the present invention is to provide such a new and improved control system for IGCC's which renders it possible through the utilization thereof to minimize the pressure drop across the control valves that are employed therewithin.

A still another object of the present invention is to provide such a new and improved control system for IGCC's which renders it possible through the utilization thereof to minimize booster compressor power.

A further object of the present invention is to provide such a new and improved control system for IGCC's that on product gas, which is produced within the gasifier that comprises one of the components of the IGCC, or on product gas/natural gas permits load changes to occur during cycling duty at approximately five percent per minute.

Yet an object of the present invention is to provide such a new and improved control system for IGCC's which renders it possible therewith to achieve stable steady state operation on product gas, which is produced within the gasifier that comprises one of the components of the IGCC, or on product gas/natural gas.

Yet a further object of the present invention is to provide such a new and improved control system for IGCC's which is advantageously characterized in that it is suitable for employment in new applications as well as in retrofit applications.

Yet another object of the present invention is to provide such a new and improved control system for IGCC's which is advantageously characterized in that it is relatively inexpensive to provide, yet despite being relatively simple in construction is reliable in operation.

SUMMARY OF THE PRESENT INVENTION

In accordance with the present invention there is provided a control system that is particularly suited for use with integrated gasification combined cycle systems (IGCC's) wherein the IGCC is comprised of a fuel feed system, a gasifier system, a product gas cleanup system, a booster compressor, a generator, a gas turbine and preferably a heat recovery steam generator (HRSG). The subject control system for IGCC's includes a first valve operative as a bleed air control valve, a second valve operative as a booster compressor bypass control valve, a third valve operative as a fuel feed control valve, and a fourth valve operative as a product gas shutoff valve to be employed particularly in emergency situations.

In accordance with the mode of operation of the subject control system for IGCC's, the load demand signal for the IGCC actuates the bleed air control valve, i.e., first valve, and the fuel feed control valve, i.e., third valve, according to a preestablished schedule of flow versus load. Actuation of these control valves stops when the desired load is reached. In this regard, rate of load change is made slow enough to prevent significant overshooting or undershooting of the desired load. Continuing, the time delay between the fuel feed system that supplies the fuel to the gasifier system and the gas turbine response is on the order of a few seconds. As such, a rate of load change of approximately five percent per minute is thus realized, i.e., a relatively slow rate, which concomitantly provides for stable operation without large overshooting or undershooting. Steady state stability is achieved by means of feedback via flow rate or pressure with trim being accomplished via the load demand signal.

With further reference thereto, in the subject control system for IGCC's the booster compressor bypass control valve, i.e., second valve, is controlled via the booster compressor control system so as to follow the bleed air control valve, i.e., first valve, such that the required air flow is thereby provided to the gasifier system. Turbine inlet temperature is preferably maintained by means of the gas turbine inlet guide vanes. As mentioned hereinbefore, the product gas shutoff valve, i.e., fourth valve, is designed to be operative particularly in emergency situations such as, for example, should there be loss of generator load.

Completing the description of the mode of operation of the subject control system for IGCC's, the air recycle at the booster compressor bypass control valve is minimized at full load so as to thereby minimize compressor power. To this end, the air bleed manifold is sized to enable bleeding of up to about twenty percent of the total gas turbine compressor air flow. However, the bleed air control valve, i.e., first valve, and booster compressor are sized to handle about twelve percent of the total gas turbine compressor air flow. The same is true of the product gas manifold. The principal reason for this is to ensure that the gas turbine will be able to accommodate the full range of possible gasifier system performance.

DESCRIPTION OF THE PREFERRED EMBODIMENT

Figure 1:
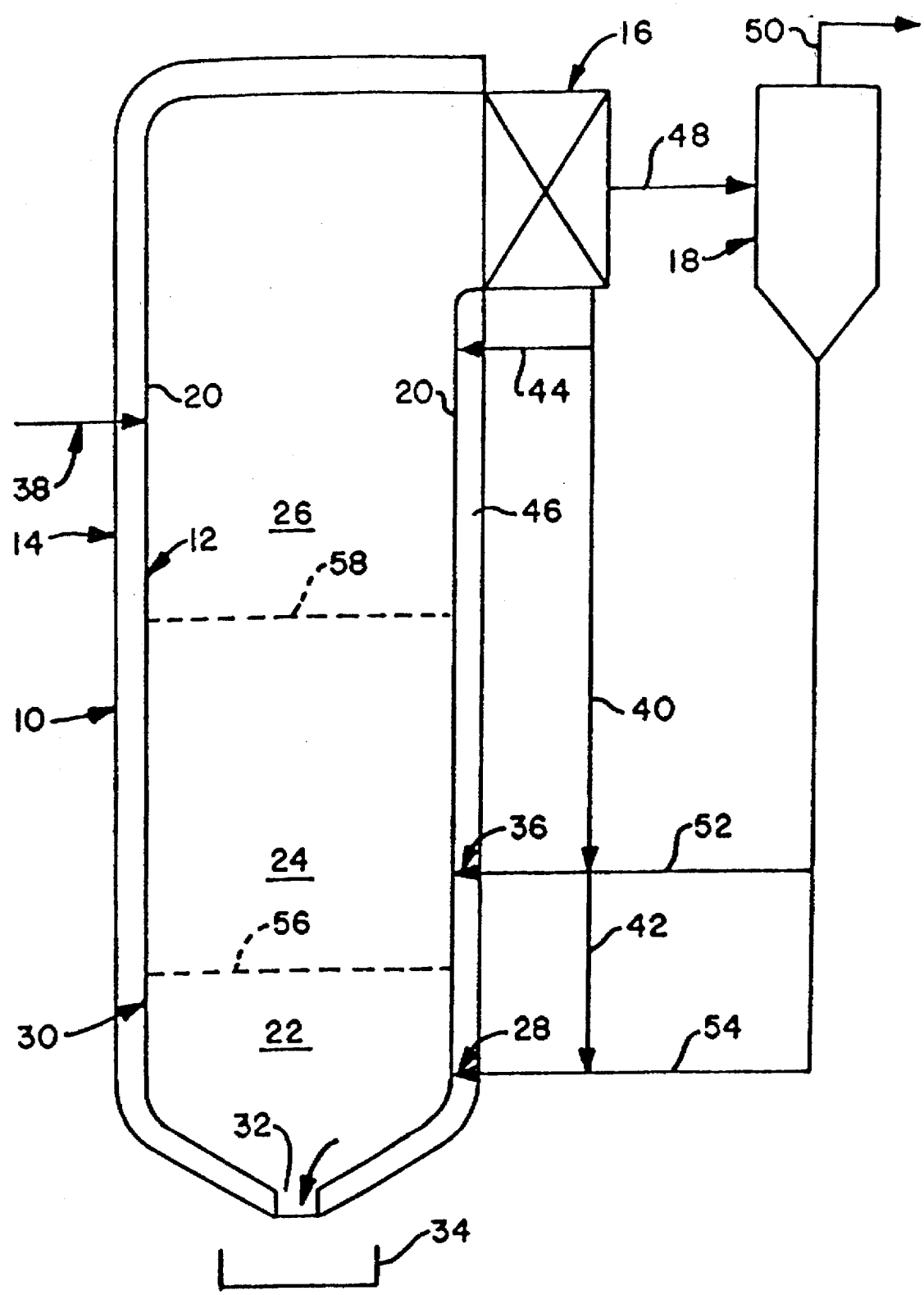
FIG. 1 is a diagrammatic illustration of the gasifier system portion of an integrated gasification control system (IGCC) with which the control system constructed in accordance with the present invention is designed to be employed.

Referring now to the drawing, and more particularly to FIG. 1 thereof, there is depicted therein the gasifier system portion, generally designated by the reference numeral 10, of an integrated gasification combined cycle system (IGCC) with which a control system constructed in accordance with the present invention is designed to be employed. As best understood with reference to FIG. 1, the gasifier system 10 includes a first, i.e., reaction vessel, generally designated by the reference numeral 12, a second, i.e., pressure containment, vessel, generally designated by the reference numeral 14; a heat exchanger means, generally designated by the reference numeral 16; and a separator means, generally designated by the reference numeral 18.

The reaction vessel 12 preferably embodies a construction wherein the walls thereof, denoted by the reference numeral 20 in FIG. 1, consist of a multiplicity of tubes, through which water is designed to flow, that are interconnected one to another such as by fusion welding whereby the reaction vessel 12 constitutes a gas-tight, fusion welded, water-cooled tube wall enclosure, which is similar in construction to that of electric utility boilers. In a fashion similar to that of electric utility boilers, steam is generated within the walls 20 of the reaction vessel 12 through the conversion to steam of the water flowing through the tubes that comprise the walls 20 of the reaction vessel 12. This steam is then available for use within the reaction vessel 12 itself and/or for use externally of the reaction vessel 12 such as, for example, to generate power in a power generation application. However, since the primary function that is to be served by the heat, which is generated within the reaction vessel 12, is to effectuate therewithin the gasification of coal, the reaction vessel 12 is designed so that a slag layer will be retained on the inner surface of the walls 20 of the reaction vessel 12. This slag layer is intended to be operative to limit the heat absorption in the waterwalls 20 of the reaction vessel 12 to a small percentage of the total heat that is generated within the reaction vessel 12.

With further reference to FIG. 1, the reaction vessel 12 in accordance with the illustration therein is divided into three interconnected zones, i.e., stages, which are designated from bottom to top in FIG. 1 by the reference numerals 22, 24 and 26, respectively. These stages 22, 24 and 26 will for ease of reference be henceforth referred to herein as the first, i.e., combustor, stage 22, the second, i.e., diffusor, stage 24 and the third, i.e., reductor, stage 26.

Considering first the combustor stage 22, char, as shown at 28 in FIG. 1, is injected thereinto. The char 28, as will be described more fully hereinafter, is transported to the combustor stage 22 by steam. Approximately two-thirds of the char which is fed into the reaction vessel 12 enters through the combustor stage 22 as char 28. In turn, air, which is required to effectuate the combustion of the char within the combustor stage 22, is injected into the combustor stage 22 as shown at 30 in FIG. 1. The combustion of the char 28 within the combustor stage 22 is designed to produce an optimum temperature therewithin of 3500° F. For purposes of attaining such an optimum temperature of 3500° F., it is necessary that the mixture of char and air burned therewithin be fuel rich. Heretofore, it has been customary to employ temperatures on the order of 3000° F. within the combustor stage of gasifier systems. However, by operating at an optimum temperature, such as 3500° F., it is possible to increase the rate at which the requisite gasification reactions will take place within the reaction vessel 12. In addition, such an optimum temperature also has the effect of enhancing slagging.

The slag, which comprises the mineral matter in the coal that is gasified within the reaction vessel 12, must be maintained in a molten state so that the slag will flow freely within the reaction vessel 12. As depicted at 32 in FIG. 1, the reaction vessel 12 is provided at the bottom thereof with a suitably dimensioned slag tap. It is through the slag tap 32 that the molten slag leaves the reaction vessel 12. Upon passing through the slag tap 32, the molten slag is quenched in a water filled slag tank denoted by the reference numeral 34 in FIG. 1, and as a consequence thereof becomes an inert, glassy, granular material.

The hot gases, which are generated within the combustor stage 22 from the combustion therewithin of the fuel-rich mixture of char and air, rise within the reaction vessel 12, and in doing so leave the combustor stage 22 and enter the diffusor stage 24 of the reaction vessel 12. As depicted at 36 in FIG. 1, additional char, i.e., the remaining one-third of the char which is fed to the reaction vessel 12, is injected into the diffusor stage 24. The char 36, as in the case of the char 28, is transported by steam in a manner to be more fully described hereinafter. Gasification of the char 36 takes place within the diffusor stage 24. The range of temperatures that exist within the diffusor stage 24 at which this gasification takes place is between 1700° F. and 2900° F. The gasification reactions that occur within the reaction vessel 12 are endothermic and continue until the temperature within the reaction vessel 12 drops to a point where the reaction rates become too low, i.e., wherein the temperature becomes too low within the reaction vessel 12 to effectively support the desired gasification reactions therewithin. As was pointed out previously herein in connection with the discussion of the combustor stage 22, the higher the temperatures that are generated within the reaction vessel 12 the faster the desired gasification reactions will take place therewithin.

Although because of the endothermic nature of the gasification reactions that take place within the reaction vessel 12 and in particular within the diffusor stage 24 thereof, the temperature of the gases as they continue to rise within the reaction vessel 12 and leave the diffusor stage 24 and enter the reductor stage 26 becomes too low, i.e., below 1700° F., to effectively support further gasification of any of the char that may remain from the char 28 and the char 36, which have been injected into the combustor stage 22 and the diffusor stage 24, respectively, of the reaction vessel 12. However, the gases as they enter the reductor stage 26 of the reaction vessel 12 are still sufficiently high enough, i.e., above 1400° F. within the reductor stage 26, to be utilized for purposes of effectuating the devolatilization of coal and the cracking of the volatile fraction thereof, such cracking thereof being desirable from the standpoint of preventing the formation of tars and condensible oils.

Accordingly, the coal that it is desired to gasify within the reaction vessel 12 is thus introduced, as shown at 38 in FIG. 1, into the reductor stage 26 thereof. In accordance with the illustration of the gasifier system 10 in FIG. 1, the coal 38 is transported to the reductor stage 26 by steam also. It is to be understood, however, that if so desired the coal 38 could be transported to the reductor stage 26 by other means, such as flue gas, product gas, $N_2$ or even air. The steam referred to hereinbefore for transporting the coal 38 could, for example, be some of the steam, which is generated within the heat exchanger means 16.

Continuing with the description thereof, the reaction vessel 12 in terms of its width is preferably suitably dimensioned such that the gases as they rise within the reaction vessel 12 do so with a velocity starting at the bottom of the reaction vessel 12, as viewed with reference to FIG. 1 of the drawing, of approximately thirty feet per second. This velocity decreases as the gases continue to rise within the reaction vessel 12. In terms of height, the reaction vessel 12 preferably is suitably dimensioned such that the gases as they rise within the reaction vessel 12 are capable of traversing the length thereof in approximately two to three seconds, i.e., the residence time of the gases within the reaction vessel 12 is on the order of two to three seconds. Obviously, therefore, there exists a need for the requisite gasification reactions to take place as quickly as possible within the reaction vessel 12. Otherwise, there will be insufficient residence time of the char 36 within the diffusor stage 24 for the gasification thereof to occur therewithin, before the char 36, being entrained in the gases rising within the reaction vessel 12, is carried therewith from the diffusor stage 24 to the reductor stage 26, and eventually, along with the char that is formed as a consequence of the devolatilization of the coal in the reductor step 26, is carried out of the reactor vessel 12.

By way of a brief summarization of the preceding description of the reaction vessel 12, char 38, which is transported thereto by steam, is injected into the combustor stage 22 of the reaction vessel 12 and is combusted therewithin with the air 30 that for this purpose is also injected into the combustor stage 22 such that an optimum temperature on the order of 3500° F. is created therewithin. The hot gases generated as a result of the combustion of the char 28 and the air 30 therewithin leaves the combustor stage 22 and enters the diffusor stage 24 of the reaction vessel 12. Within the diffusor stage 24, the $CO_2$ and $H_2O$ present in the hot gases react with the char 36, which is injected into the diffusor stage 24, and as a consequence thereof causes the char 36 to gasify. The gasification reactions by which the char 36 becomes gasified are endothermic and continue until the temperature drops to a point where the reaction rate becomes too low, i.e., below approximately 1700° F., to effectively support further gasification of the char 36. It is at this point, i.e., when the temperature thereof drops to around 1700° F., that the gases, which are rising within the reaction vessel 12, leave the diffusor stage 24 and enter the reductor stage 26 of the reaction vessel 12. The temperature of the gases is still sufficiently high enough, i.e., above approximately 1400° F., within the reductor stage 26, however, to cause rapid devolatilization therewithin of the coal 38 that is injected into the reductor stage 26 as well as the cracking of the volatile fraction thereof thereby preventing the formation therefrom of tars and condensible oils. After completing its traverse of the reductor stage 26 of the reaction vessel 12, the char, which consists of a mixture of unburned carbon and ash, is carried out of the reaction vessel 12 along with the product gas stream, by virtue of being entrained therewithin, that has been produced within the reaction vessel 12.

From the reaction vessel 12, the product gas stream with the char still entrained therewithin flows to and through the heat exchanger means 16, the latter as illustrated in FIG. 1 of the drawing being located in the gasifier system 10 such as to be located downstream of the reaction vessel 12 and more specifically, downstream of the reductor stage 26 of the reaction vessel 12. In known fashion, the heat exchanger means 16 is suitably provided with tubes through which water is caused to flow. Accordingly, as the product gas stream, with the char still entrained therewithin, that has been produced within the reaction vessel 12 flows through the heat exchanger means 16, the product gas stream gives up sufficient heat to transform to steam the water that is flowing through the tubes of the heat exchanger means 16. A portion of the steam, which is so produced within the heat exchanger means 16, is employed, as depicted schematically at 40 and 42, respectively, in FIG. 1 of the drawing, for purposes of transporting the char 36 to the diffusor stage 24 and the char 28 to the combustor stage 22 of the reaction vessel 12. In addition, another portion of the steam so produced in the heat exchanger means 16 is also supplied, as illustrated schematically at 44 in FIG. 1 of the drawing, to the annulus, denoted by the reference numeral 46 in FIG. 1, that exists between the reaction vessel 12 and the pressure containment vessel 14.

After flowing through the heat exchanger means 16, the product gas stream with the char still entrained therewithin flows, as depicted schematically at 48 in FIG. 1, to the separator means 18. The separator means 18 may take the form of a cyclone, or any other similar conventional device, that is operative to effectuate therewithin the separation of the char, which is entrained within the product gas stream, from the product gas stream itself. Following the separation of the char therefrom, the product gas stream, as depicted at 50 in FIG. 1 of the drawing, exits from the separator means 18. Likewise, the char, following the separation thereof from the product gas stream in the separator means 18, also exits from the separator means 18 and as illustrated schematically at 52 and 54, respectively, in FIG. 1 is recycled back to the reaction vessel 12 and more specifically to the diffusor stage 24 and the combustor stage 22 of the reaction vessel 12. To this end, as has been described more fully hereinbefore, a portion of the steam that is produced within the heat exchanger means 16 is utilized to effect the transport of the char, which is separated from the product gas stream within the separator means 18, to the diffusor stage 24 and the combustor stage 22, respectively, of the reaction vessel 12.

Continuing with the description of the gasifier system 10 as depicted schematically in FIG. 1 of the drawing, the reaction vessel 12, as best understood with reference to FIG. 1, is suitably surrounded by the pressure containment vessel 14 such that there exists therebetween the annulus 46, to which reference has briefly been made hereinbefore. The annulus 46 in turn is designed to be filled with a suitable pressurized medium. In the case of the gasifier system 10, which is depicted in FIG. 1 of the drawing, the pressurized medium, as shown therein at 44, comprises steam. Moreover, as has been described hereinbefore this steam 44 represents a portion of the steam, which is produced within the heat exchanger means 16, from the heat exchange that occurs therewithin between the product gas stream in which the char is entrained and the water flowing through the tubes of the heat exchanger means 16 as the product gas stream in which the char is contained is made to pass through the heat exchanger means 16 upon exiting from the reductor stage 26 of the reaction vessel 12. The steam 44 which fills the annulus 46 is suitably pressurized such that the pressure thereof is greater than the pressure within the reaction vessel 12. As such, since the steam 44 within the annulus 46 is at a greater pressure than the pressure within the reaction vessel 12, in the event that a leak should occur in the reaction vessel 12 the steam 44 will thus flow from the annulus 46 into the reaction vessel 12. The pressure containment vessel 14, as will be best understood with reference to FIG. 1 of the drawing, is suitably provided with a plurality of openings such as to permit the molten slag to flow to the water filled slag tank 34, to permit the char 28 to be injected into the combustor stage 22 of the reaction vessel 12, to permit the air 30 to be injected into the combustor stage 22 of the reaction vessel 12, to permit the char 36 to be injected into the diffusor stage 24 of the reaction vessel 12, to permit the coal 38 to be injected into the reductor stage 26 of the reaction vessel 12, to permit the steam 44 to flow into the annulus 46 between the reaction vessel 12 and the pressure containment vessel 14, and to permit the product gas stream 48 in which the char is entrained to leave the reaction vessel 12, and more specifically the reductor stage 26 thereof, and enter the heat exchanger means 16. Finally, it should be clearly understood that the reaction vessel 12 in terms of its actual physical configuration is continuous in length, and that although from the standpoint of what occurs within the reaction vessel 12 the reaction vessel 12 may be considered to embody the three stages, i.e., the combustor stage 22, the diffusor stage 24 and the reductor stage 26, that have been described in detail hereinbefore, the demarcation between these various stages has been depicted, simply for ease of reference, through the use of the imaginary, dotted lines that are denoted by the reference numerals 56 and 58 in FIG. 1 such that the dotted line 56 as employed in FIG. 1 is simply intended to illustrate the approximate location within the reaction vessel 12 whereat the combustor stage 22 ends and the diffusor stage 24 begins whereas the dotted line as employed in FIG. 1 is simply intended to illustrate the approximate location within the reaction vessel 12 whereat the diffusor stage 24 ends and the reductor stage 26 begins.

A discussion will now be had herein of the control system, constructed in accordance with the present invention, for an integrated gasification combined cycle system (IGCC). For this purpose reference will be had in particular to FIG. 2 of the drawing wherein the control system is generally designated by the reference numeral 60 and wherein the integrated gasification combined cycle system with which the control system 60 is particularly suited to be employed is generally designated by the reference numeral 62. Considering first the integrated gasification combined cycle system 62, the major components thereof, as best understood with reference to FIG. 2 of the drawing wherein they are depicted schematically, are the fuel feed system, denoted therein generally by the reference numeral 64; the gasifier system 10, a detailed description of which has been set forth hereinbefore; the gas cleanup system, denoted therein generally by the reference numeral 66; the booster compressor, denoted therein generally by the reference numeral 68; the gas turbine, denoted therein generally by the reference numeral 70; the generator, denoted therein generally by the reference numeral 72; and the heat recovery steam generator, denoted therein generally by the reference numeral 74.

Continuing with the description of the integrated gasification combined cycle system 62, the fuel feed system 64 is designed to be operative to supply in known fashion fuel to the gasifier system 10. More specifically, the fuel feed system 64 is designed to be operative to supply, as depicted by the reference numeral 76 in FIG. 2, to the gasifier system the coal, denoted by the reference numeral 38 in FIG. 1, that it is desired to gasify within the gasifier system 10. Inasmuch as the gasifier system 10 has been described in detail hereinbefore, it is not deemed necessary to reiterate this description again at this point. Suffice to say that in the manner which has been described hereinbefore the gasifier system 10 is designed to be operative to gasify therewithin the fuel that is supplied thereto and to produce as a consequence of the gasifying of this fuel a product gas. The product gas, which is produced within the gasifier system 10, is then supplied, as depicted by the reference numeral 78 in FIG. 2, to the gas cleanup system 66. In turn, the gas cleanup system 66 is designed to be operative to effect in known fashion the cleansing of the product gas that is produced within the gasifier system 10 such as to render this product gas suitable for acceptance by the gas turbine 70. By way of exemplification and not limitation, one form of gas cleanup system that is suitable for employment as the gas cleanup system 66 of the integrated gasification combined cycle 62 is that which forms the subject matter of U.S. Pat. No. 5,130,097, which is entitled "Apparatus for Hot-Gas Desulfurization of Fuel Gases" and which issued on Jul. 14, 1992 to the United States of America as represented by the Department of Energy.

Figure 2:
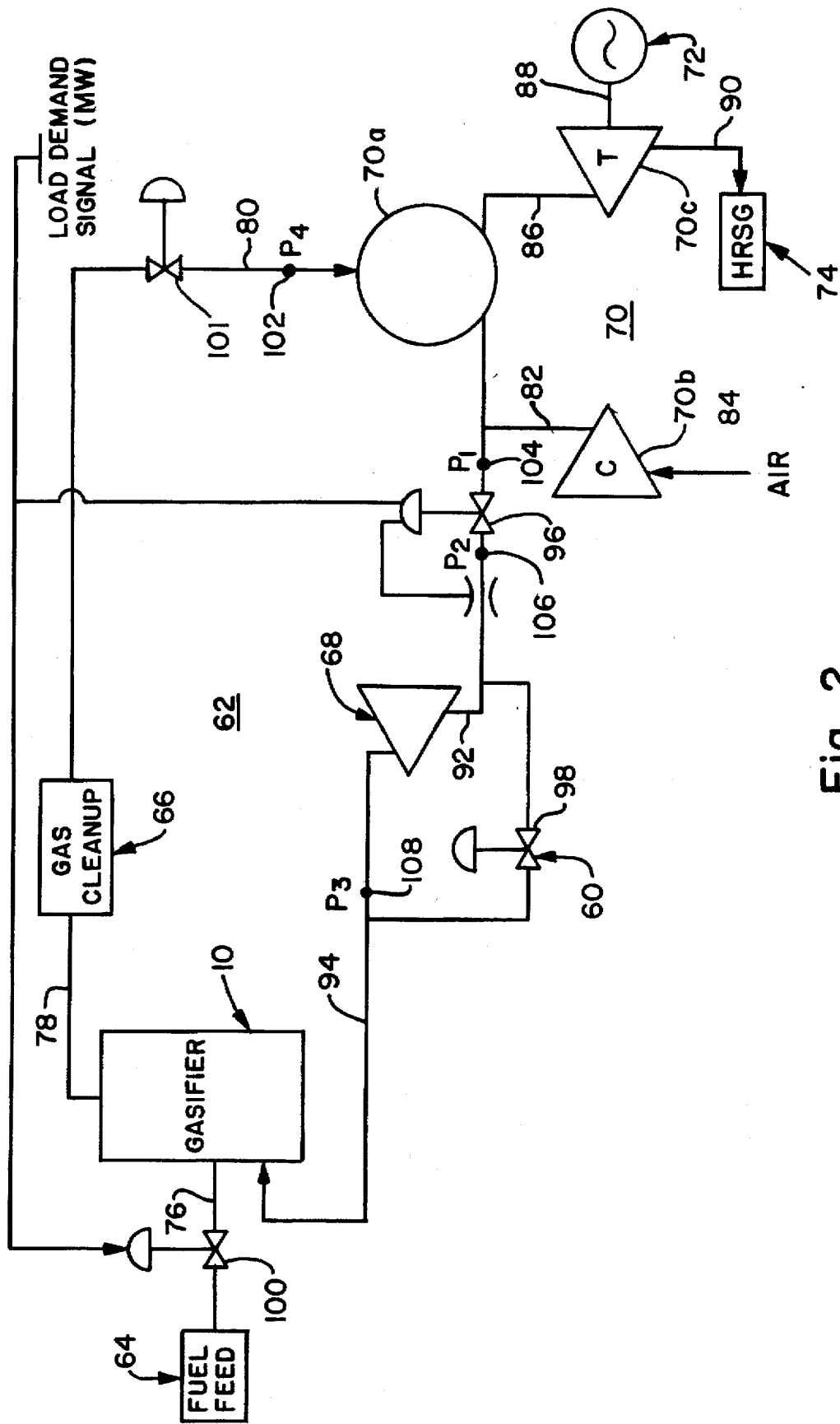
FIG. 2 is a diagrammatic illustration of a control system constructed in accordance with the present invention depicted cooperatively associated with an integrated gasification combined cycle system (IGCC).

With further reference to the integrated gasification combined cycle system 62, the product gas, after leaving the gas cleanup system 66 is fed, as depicted by the reference numeral 80 in FIG. 2, to the gas turbine 70. More specifically, this product gas is fed to the combustor portion, denoted by the reference numeral 70a in FIG. 2, which in known fashion comprises one of the components of the gas turbine 70. It is within the combustor portion 70a of the gas turbine 70 that the product gas, which is fed thereto as shown at 80 in FIG. 2, is burned. To this end, the air that is required to effect this burning of the product gas within the combustor portion 70a is fed thereto, as depicted by the reference numeral 82 in FIG. 2, from the compressor, denoted by the reference numeral 70b in FIG. 2, which in known fashion comprises another component of the gas turbine 70. As depicted at 84 in FIG. 2, in known fashion air is designed to be supplied to the compressor 70b from a suitable source of supply thereof, now shown in the drawing in the interest of maintaining clarity of illustration therewithin. Any conventional source of supply (not shown) of air suitable for use for such a purpose may be utilized for this purpose. The gases, which are generated within the combustor portion 70a of the gas turbine 70 as a result of the combustion therewithin of the product gas fed thereto as seen at 80 in FIG. 2, thereafter leave, as depicted by the reference numeral 86 in FIG. 2, the combustor portion 70a and flow to the turbine portion, denoted by the reference numeral 70c in FIG. 2, which in known fashion comprises yet another component of the gas turbine 70. In a manner well-known to those skilled in the industry, these gases are operative within the turbine portion 70c, by virtue of the passage thereof through the vanes of the turbine portion 70c, to effect the rotation of the rotor of the turbine portion 70c. This rotation of the rotor of the turbine portion 70c in turn is transmitted to the generator 72, with which in a conventional manner the turbine portion 70c is suitably coupled, as depicted by the reference numeral 88 in FIG. 2, such that the generator 72 is operative to produce electricity. The electricity produced by the generator 72 in known fashion is transmitted to any suitable point of utilization thereof, now shown in the drawing in the interest of maintaining clarity of illustration therein.

Completing the discussion thereof, the integrated gasification combined cycle system 62, in accord with the illustration thereof in FIG. 2 of the drawing preferably also includes the heat recovery steam generator (HRSG) 74 and the booster compressor 68. The heat recovery steam generator 74 is designed to be operative to receive, as depicted at 90 in FIG. 2, the gases from the turbine portion 70c of the gas turbine 70 after the passage thereof through the vanes of the turbine portion 70c. The function of the heat recovery steam generator 74, as is well-known to those skilled in the industry, is to make use of the heat that is still contained in the gases that are received thereby from the turbine portion 70c of the gas turbine 70 to produce steam therefrom. This steam is then available from the heat recovery steam generator 74 for use as seen fit. The booster compressor 68, on the other hand, is connected in fluid flow relation, as depicted at 92 in FIG. 2, with the compressor 70b of the gas turbine 70 such as to be capable of receiving from the compressor 70b a portion of the air that has been initially compressed therewithin. That portion of the air, which is made to flow from the compressor 70b of the gas turbine 70 to the booster compressor 68, is designed to be further compressed within the booster compressor 68 before being supplied therefrom, as depicted at 94 in FIG. 2, to the gasifier system 10. This air, which is supplied to the gasifier system 10 from the booster compressor 68, constitutes the air, denoted by the reference numeral 30 in FIG. 1, that is employed to effect the combustion of the fuel within the gasifier system 10 in the fashion described hereinbefore in connection with the previous discussion herein of the gasifier system 10.

Next there will be had herein a discussion of the control system 60, constructed in accordance with the present invention, that is particularly suited for employment with an integrated gasifier combined cycle system, such as the integrated gasifier combined cycle system 62 described hereinabove. For purposes of this discussion of the control system 60, reference will be had in particular to FIG. 2 of the drawing. Thus, as best understood with reference to FIG. 2, the control system 60 includes a first valve, denoted by the reference numeral 96, that is suitably connected in fluid flow relation between the compressor 70b of the gas turbine 70 and the booster compressor 68 so as to be operative to control the fluid flow therebetween; a second valve, denoted by the reference numeral 98, that is suitably connected in fluid flow relation between the upstream side and the downstream side of the booster compressor 68 so as to be operative to enable the fluid flow to be bypassed around the booster compressor 68; a third valve, denoted by the reference numeral 100, connected in fluid flow relation between the fuel feed system 64 and the gasifier system 10 so as to be operative to control the fuel feed therebetween; and a fourth valve, preferably located at the point $P_4$, seen at 102 in FIG. 2, so as to be connected in fluid flow relation between the gas cleanup system 66 and the combustor portion 70a of the gas turbine 70 and so as to be operative, particularly in emergency situations, to effect a discontinuance of the product gas flow between the gas cleanup system 66 and the gas turbine 70.

Continuing with the discussion of the control system 60, the mode of operation thereof will now be described. However, before doing so, note is first taken here of the inclusion in FIG. 2 of the drawing of the point $P_1$ seen therein at 104, the point $P_2$, seen therein at 106, the point $P_3$, seen therein at 108, and the point $P_4$, seen at 102, to which reference has previously been had herein. In accord with the mode of operation of the control system 60 as depicted in FIG. 2 of the drawing, the point $P_1$, is intended to represent the approximate location in the control system 60 whereat the bleed air manifold pressure is designed to be measured, while the point $P_2$ is intended to represent the approximate location in the control system 60 whereat the bleed air control valve outlet pressure is designed to be measured. Similarly, in accord with the mode of operation of the control system 60 as depicted in FIG. 2 of the drawing, the point $P_3$ is intended to represent the approximate location in the control system 60 whereat the booster compressor discharge pressure is designed to be measured, whereas the point $P_4$ is intended to represent the approximate location in the control system 60 whereat the gas turbine product gas manifold pressure is designed to be measured.

As constructed in accordance with the present invention, the control system 60 accomplishes a number of things. For instance, through the use of the control system 60 it is possible to eliminate the need for a control valve located in the integrated gasification combined cycle system 60 downstream of the gas cleanup system 66 whereat a hot, corrosive environment exists. Also, the control system 60 renders it possible to minimize the pressure drop across the control valves that are employed therein. In addition, the control system 60 renders it possible to minimize the power required to operate the booster compressor 68. To this end, the principal objective intended to be achieved with the control system 60 of the present invention is to be able to effect load changes for cycling duty at a rate of approximately five percent per minute and to permit stable steady state operation when the gas turbine 70 is being operated on the product gas that is produced with the gasifier system 10 or on a combination of this product gas and natural gas, such as to thereby be able to maximize the efficiency of the integrated gasification combined cycle system 62 with which the control system 60 is being utilized.

With further reference to the mode of operation of the control system 60, in accordance therewith the control valve 96 and the controls valve 100 are both actuated, as schematically shown in FIG. 2, from the load demand signal for the integrated gasification combined cycle system 62 according to a preestablished schedule of flow versus load. When the desired load is reached, actuation of the control valves 96 and 100 from the load demand signal of the integrated gasification combined cycle system 62 stops. The rate of load change is purposely made slow enough to prevent any significant overshooting or undershooting of the desired load. In this regard, the time delay between the changes in the fuel feed occasioned by the control valve 100 and the changes in the response of the gas turbine 70 is on the order of a few seconds. As such, a rate of load change on the order of approximately five percent per minute is attainable, which is deemed to be a relatively slow rate, thus resulting in a stable operation without any undue overshooting or undershooting of the desired load. Steady state stability is achieved by means of feedback via flow rate or pressure with trim being accomplished via the load demand signal transmitted to the control valves 96 and 100 from the integrated gasification combined cycle system 60.

Continuing, the booster compressor bypass control valve 98 is controlled via the control system of the booster compressor 68 so as to follow the bleed air control valve 96 such that the required air flow is thereby provided to the gasifier system 10. The inlet temperature of the gas turbine 70 is preferably maintained by means of the inlet guide vanes of the turbine portion 70c of the gas turbine. The fuel shutoff valve located at 102 in the control system 60 is designed to be operative particularly in emergency situations such as, for example, should the generator 72 lose load.

Completing the description of the mode of operation of the control system 60 depicted in FIG. 2 of the drawing being employed with the integrated gasification combined cycle system 62, the air recycle at the booster compressor bypass control valve 98 is minimized at full load so as to thereby minimize the power required for the booster compressor 68. To this end, the air bleed manifold located approximately at 104 in the control system 60 is sized to enable bleeding of up to about twenty percent of the total air flow to the compressor 70b of the gas turbine 70. However, the bleed air control valve 96 and booster compressor 68 are sized to handle about twelve percent of the total air flow to the compressor 70b of the gas turbine 70. The same is true of the product gas manifold located approximately at 102 in the control system 60. The principal reason for this is to ensure that the gas turbine 70 will be able to accommodate the full range of possible performance of the gasifier system 10.

Thus, in accordance with the present invention there has been provided a new and improved control system. Plus, there has been provided in accord with the present invention such a new and improved control system that is particularly suited to be used with integrated gasification combined cycle systems (IGCC's). Besides, in accordance with the present invention there has been provided such a new and improved control system for IGCC's which is operative without requiring that a control valve be located downstream of the cleanup system for the gas, which is produced within the gasifier that comprises one of the components of the IGCC. As well, there has been provided in accord with the present invention such a new and improved control system for IGCC's which renders it possible through the utilization thereof to minimize the pressure drop across the control valves that are employed therewithin. Moreover, in accordance with the present invention there has been provided such a new and improved control system for IGCC's that on product gas, which is produced within the gasifier that comprises one of the components of the IGCC, or on product gas/natural gas permits load changes to occur during cycling duty at approximately five percent per minute. Also, there has been provided in accord with the present invention such a new and improved control system for IGCC's which renders it possible through the utilization thereof to minimize booster compressor power. Further, in accordance with the present invention there has been provided such a new and improved control system for IGCC's which renders it possible therewith to achieve stable steady state operation on product gas, which is produced within the gasifier that comprises one of the components of the IGCC, or on product gas/natural gas. Penultimately, there has been provided in accord with the present invention such a new and improved control system for IGCC's which is advantageously characterized in that it is suitable for employment in new applications as well as in retrofit applications. Finally, in accordance with the present invention there has been provided such a new and improved control system for IGCC's which is advantageously characterized in that it is relatively inexpensive to provide, yet despite being relatively simple in construction is reliable in operation.

While one embodiment of our invention has been shown, it will be appreciated that modifications thereof, some of which have been alluded to hereinabove, may still be readily made thereto by those skilled in the art. We, therefore, intend by the appended claims to cover the modifications alluded to herein as well as all the other modifications which fall within the true spirit and scope of our invention.

What is claimed is:

1. In a method for exercising control over an integrated gasification combined cycle system having a gasifier operative to gasify therewithin fuel supplied thereto in order to thereby produce a product gas therefrom, a fuel feed supply system connected to the gasifier system for supplying fuel thereto, a gas cleanup system connected to the gasifier system for receiving product gas therefrom and operative to cleanse the product gas during the passage thereof through the gas cleanup system, a combustor chamber connected to the gas cleanup system for receiving cleansed product gas therefrom and operative to effect the combustion therewithin of the cleansed product gas, a compressor connected to the combustor chamber for supplying combustion supporting air thereto, a booster compressor connected to the compressor for receiving bleed air therefrom, a gas turbine connected to the combustor chamber for receiving therefrom the gases generated from the combustion of cleansed product gas within the combustor chamber and operative to produce a driving force therefrom, a generator connected to and driven by the gas turbine so as to be operative to generate an electrical load including the steps of providing between the compressor and the booster compressor in connected relation thereto a bleed air control valve operative to control the amount of bleed air supplied from the compressor to the booster compressor, providing in bypass relation around the booster compressor a booster compressor bypass valve operative to effect the bypass of bleed air around the booster compressor, providing between the fuel feed system and the gasifier system in connected relation thereto a fuel feed control valve operative to control the amount of fuel supplied from the fuel feed system to the gasifier system, the improvement in the method for exercising control over an integrated gasification combined cycle system wherein load changes for cycling duty are effected therewith at a rate of approximately five percent per minute in order to thereby permit stable state operation of the gas turbine comprising the steps of:

a. generating within the integrated gasification combined cycle system a signal representative of the load demand on the gas turbine;

b. providing the signal representative of the load demand on the gas turbine to the bleed air control valve and providing the same signal representative of the load demand on the gas turbine also to the fuel feed control valve;

c. actuating the bleed air control valve in response to the receipt thereby of the signal representative of the load demand on the gas turbine in order to thereby effectuate control over the amount of bleed air supplied to the booster compressor; and d. simultaneous with the actuation of the bleed air control valve actuating the fuel feed control valve in response to the receipt thereby of the signal representative of the load demand on the gas turbine in order to thereby effectuate control over the amount of fuel supplied to the gasifier system.

2. In a method for exercising control over an integrated gasification combined cycle system, the improvement in the method for exercising control over an integrated gasification combined cycle system wherein load changes for cycling duty are effected therewith at a rate of approximately five percent per minute in order to thereby permit stable state operation of the gas turbine further comprising the steps of:

a. providing between the gas cleanup system and the combustor chamber in connected relation thereto a shutoff valve; and b. effecting through operation of the shutoff valve the shutting off of the flow of cleansed product gas to the combustor chamber.

* * * * *